United States Patent
Aoike et al.

(10) Patent No.: US 8,647,495 B2
(45) Date of Patent: Feb. 11, 2014

(54) ELECTROLYTICALLY ETCHING METHOD AND APPARATUS OF SURFACE OF NUCLEAR REACTOR CORE INTERNALS

(75) Inventors: Satoru Aoike, Tokai (JP); Masaaki Tanaka, Hitachi (JP); Koichi Kurosawa, Hitachi (JP); Shinobu Okido, Mito (JP); Shinya Ohmori, Mito (JP)

(73) Assignee: Hitachi-GE Nuclear Energy, Ltd., Ibaraki (JP)

( * ) Notice: Subject to any disclaimer, the term of this patent is extended or adjusted under 35 U.S.C. 154(b) by 544 days.

(21) Appl. No.: 12/943,227

(22) Filed: Nov. 10, 2010

(65) Prior Publication Data

US 2011/0114507 A1     May 19, 2011

(30) Foreign Application Priority Data

Nov. 16, 2009   (JP) ................. 2009-260562

(51) Int. Cl.
  *C25F 3/14*   (2006.01)
(52) U.S. Cl.
  USPC ............ 205/668; 205/640; 205/704; 205/705
(58) Field of Classification Search
  USPC ................................ 205/640, 668, 704, 705
  See application file for complete search history.

(56) References Cited

U.S. PATENT DOCUMENTS

| | | | | |
|---|---|---|---|---|
| 3,337,434 | A * | 8/1967 | Jamieson et al. | ............. 205/668 |
| 4,661,220 | A | 4/1987 | Fejes et al. | |
| 2005/0230267 | A1 * | 10/2005 | Veatch et al. | ................. 205/687 |
| 2006/0249397 | A1 * | 11/2006 | Lee et al. | ...................... 205/644 |
| 2006/0260952 | A1 | 11/2006 | Mazur et al. | |
| 2008/0244848 | A1 * | 10/2008 | Firouzman | ...................... 15/118 |
| 2010/0089164 | A1 | 4/2010 | Aoike et al. | |

FOREIGN PATENT DOCUMENTS

| | | |
|---|---|---|
| DE | 35 22 944 | 1/1986 |
| JP | 60-063400 | 4/1985 |
| JP | 60-63400 | 4/1985 |
| JP | 2-285250 | 11/1990 |

(Continued)

OTHER PUBLICATIONS

Satoru Aoike et al., Development of Underwater Remote Inspection Technique for Nuclear Reactor Core Internals, Japan Society of Maintenology, 7th academic lecture meeting abstract reports, Jul. 13 to Jul. 15, 2010.

(Continued)

*Primary Examiner* — Nicholas A Smith
(74) *Attorney, Agent, or Firm* — Antonelli, Terry, Stout & Kraus, LLP.

(57) ABSTRACT

Even a site having a complicated curved surface shape, such as a welded spot on a bottom of a nuclear reactor core, is simply and electrolytically etched without discharging an etching liquid in a large amount, whereby grain boundary on the surface of the nuclear reactor core internals can be confirmed visually.

When the surface of nuclear reactor core internals is electrolytically etched, a sponge provided with holes having a communicating structure is integrated with an etching liquid, and the etching liquid is gelled, while the integrated combination is disposed in front of an electrode, followed by the application of voltage to turn on electricity at a state in which said electrode is electrically connected to the cathode of a direct-current power supply, and brought into contact with or approximated to the surface of the core internals electrically connected to the anode of the direct-current power supply.

5 Claims, 6 Drawing Sheets

(56) References Cited

FOREIGN PATENT DOCUMENTS

| | | |
|---|---|---|
| JP | 4-335150 | 11/1992 |
| JP | 9-89786 | 4/1997 |
| JP | 2003-255074 | 9/2003 |
| JP | 2004-359983 | 12/2004 |
| JP | 2008-539334 | 11/2008 |
| JP | 2010-96563 | 4/2010 |

OTHER PUBLICATIONS

Office Action issued in Japanese Patent Application No. 2009-260562 on Oct. 2, 2012.

French Office Action in Corresponding Application No. 1059375, dated May 31, 2013.

* cited by examiner

ELECTROLYTICALLY ETCHING METHOD AND APPARATUS OF SURFACE OF NUCLEAR REACTOR CORE INTERNALS

FIELD OF THE INVENTION

The present invention relates to a method of electrolytically etching a surface of nuclear reactor core internals in a nuclear power plant and an electrolytic etching apparatus therefor.

BACKGROUND OF THE INVENTION

With respect to an electrolytic etching method and apparatus, as publically known typical examples wherein a metal surface is electrolytically etched with an electrolytic etching liquid locally retained adjacent to an electrode, Patent Documents 1 and 2 are enumerated.

Patent Document 1 relates to a method of polishing a metal surface, characterized in that an etching liquid is retained in an area surrounded by an ionic-conductive membrane.

Patent Document 2 relates to a decontamination method for removing an oxide film including a radionuclide, and the like, which adhere to the metal surface of an apparatus or machinery and tools in a nuclear power plant, characterized in that an electrolyte film is brought into contact with the metal surface, and an electrode coming into contact with the electrolyte film is energized, whereby the oxide film and the like are removed.

BRIEF SUMMARY OF THE INVENTION

When it is estimated whether a crack caused on nuclear reactor core internals in a nuclear power plant is stress corrosion cracking, it is an important evaluation index to identify whether a main developing route of the crack is a grain boundary. Therefore, it is desired to simply make a grain boundary on the surface of nuclear reactor core internals visible. As a method for making the grain boundary visible, there are an etching method wherein aqua regia is used, and an electrolytic etching method wherein a metal surface is energized in a state in which the metal surface is brought into contact with an etching liquid such as an aqueous oxalic acid solution. However, it is desired not to discharge an etching liquid into a reactor water in plenty when the execution of works is carried out in a nuclear reactor. Therefore, it becomes necessary to retain the etching liquid adjacent to an execution surface in a state in which a container opening is watertightly brought into contact with the execution surface. However, a complicated curved surface shape such as a weld zone at the bottom of the nuclear reactor may make it difficult to watertightly bring the container opening into contact with the execution surface, and thus an etching method, wherein it is not necessary to form watertight space through the container and the execution surface, is desired. As the etching method wherein it is not necessary to form a watertight space through the container and the execution surface, there are an electropolishing method to a metal surface and a decontamination method thereto such as ones in Patent Documents 1 and 2.

However, in Patent Document 1, an etching liquid is retained merely through an ionic-conductive membrane, and thus in case the ionic-conductive membrane is broken, plenty of the etching liquid may be discharged into a nuclear reactor. In case of Patent Document 2, a gel of an acidic etching liquid such as an aqueous oxalic acid solution is brittle, and thus it may be damaged in a process of accessing to it to an execution surface by remote control in water.

[Patent Document 1] JP-A-2008-539334.
[Patent Document 2] JP-A-60-63400.

The present invention has been made in consideration of the problems mentioned above. The purpose of the present invention is to provide a method of simply and electrolytically etching a weld zone without discharging an etching liquid in plenty, the weld zone having a complicated curved surface shape and lying at the bottom of a nuclear reactor, whereby a grain boundary on the surface can be visually confirmed.

The present invention provides an electrolytic etching apparatus for electrolytically etching a surface of nuclear reactor core internals, characterized in that said apparatus comprises:

a direct-current power supply electrically connected to the surface of the core internals; and an electrolytic etching electrode electrically connected to said direct-current power supply, wherein said electrolytic etching electrode is provided with a sponge with a gelled etching liquid arranged (infiltrated) into its holes having a communicating structure.

The electrolytic etching apparatus of the present invention can further comprise air bubbles distributed in said sponge of said electrolytic etching electrode.

In the electrolytic etching apparatus of the present invention, said air bubbles can be sprinkled in the sponge at a ratio such that the specific gravity of the whole sponge in an integrated manner with the gelled etching liquid becomes less than 1 at a water pressure at an execution position.

The present invention further provides an electrolytic etching method for electrolytically etching a surface of nuclear reactor core internals, comprising the step of:

turning on electricity at a state in which an electrolytic etching electrode is brought into contact with or approximated to a surface of the core internals electrically connected to an anode of a direct-current power supply, wherein said electrolytic etching electrode is electrically connected to a cathode of the direct-current power supply and is provided with a sponge with a gelled etching liquid arranged (infiltrated) into its holes having a communicating structure.

The electrolytic etching method of the present invention can further include the step of carrying out the electrolytic etching in water, wherein air bubbles are distributed in said sponge of said electrolytic etching electrode.

The electrolytic etching method of the present invention can further include the step of sucking in water adjacent to the electrolytic etching electrode during turning on electricity.

The electrolytic etching method of the present invention can further include the steps of: electrolytically etching the surface of nuclear reactor core internals by turning on a direct-current power supply; and then carrying out an enlarged observation of the surface of nuclear reactor core internals to confirm a surface state.

In the electrolytic etching method of the present invention, the enlarged observation of the surface of nuclear reactor core internals can be carried out by transcribing a surface aspect (shape) of the surface of nuclear reactor core internals to a replica once and then enlarged-observing a surface of the replica recovered.

ADVANTAGES OF THE INVENTION

According to the present invention, the gelled etching liquid is disposed in front of the negative electrode (cathode) in an integrated manner with the sponge, and thus it is not necessary to form a watertight space through an execution surface and a container. The structure of the electrolytic etching apparatus can be simplified since a supply system for the etching liquid is not necessary. Furthermore, since the etching liquid is solidified into gel in an integrated manner with the sponge, the gel is difficult to be damaged, and even a distant execution surface can be stably executed.

Furthermore, since the electrolytic etching electrode is excellent in shape-follow-up properties due to the combination of the gel and the sponge, it is good in adhesiveness even to a site having a complicated curved surface shape, which lies at the bottom of a nuclear reactor core, whereby an electrolytic etching having surface irregularity after etching can be attained. In addition, according to the present invention, since the electrolytic etching liquid used for execution is previously gelled, the etching liquid discharged into the nuclear reactor is in small volumes.

Other objects, features and advantages of the invention will become apparent from the following description of the embodiments of the invention taken in conjunction with the accompanying drawings.

DETAILED DESCRIPTION OF THE INVENTION

The electrolytic etching apparatus of the present invention comprises a sponge wherein holes have a communicating structure, an electrode, and a gelled etching liquid which is disposed in front of the electrode in an integrated manner with the sponge, in electrolytically etching the surface of nuclear reactor core internals. Electricity is turned on by applying a voltage at a state in which an electrolytic etching electrode electrically connected to the cathode of a direct-current power supply is brought into contact with or is approximated to a surface of the core internals electrically connected to the anode of a direct-current power supply by using the electrolytic etching electrode and the direct-current power supply.

The term "gelled" represents both an action of coagulating (binding) a liquid to jelly and an action of increasing a viscosity of a liquid by adding agarose etc. to the liquid.

Hereinafter, examples of the present invention will be illustrated using the drawings.

EXAMPLE 1

Figure 1:
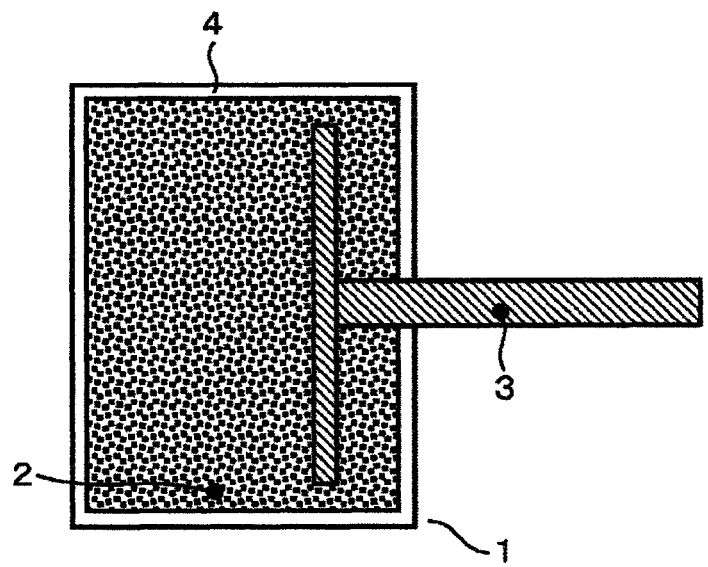
FIG. 1 is a diagram illustrating an example of an electrolytic etching electrode of the present invention for electrolytically etching the surface of nuclear reactor core internals.

An electrolytic etching electrode of the present invention for electrolytically etching the surface of nuclear reactor core internals is illustrated using FIG. 1.

An electrolytic etching electrode (1) of the present invention comprises at least a sponge (2) wherein holes have a communicating structure, an electrode (3), and a gelled etching liquid (4) which is disposed in front of the electrode (3) in an integrated manner with the sponge (2). For the etching liquid, for example, a 10 wt % aqueous solution of oxalic acid is used, while for the gelling agent, for example, agarose is used.

The integration of the etching liquid and the sponge (2), wherein holes have a communicating structure, is carried out by infiltrating the sponge (2), wherein its holes have a communicating structure, with a mixed liquid of a etching liquid and a gelling agent, followed by the gelation of the mixed liquid, wherein the sponge (2) is previously installed in front of the electrode (3).

For the electrode (3), it is desirable to use austenitic stainless steel or platinum.

By using the electrolytic etching electrode (1), it does not become necessary to form a watertight space through an execution surface and a container in the electrolytic etching. Thus, an electrolytic etching can be easily conducted onto the bottom of a nuclear reactor core having a curved surface shape. Additionally, the structure of the electrolytic etching apparatus can be simplified since a supply system for the etching liquid becomes unnecessary. Furthermore, since the etching liquid is solidified into gel in an integrated manner with the sponge, the gel is difficult to be damaged, and even a distant execution surface can be stably executed.

EXAMPLE 2

Figure 2:
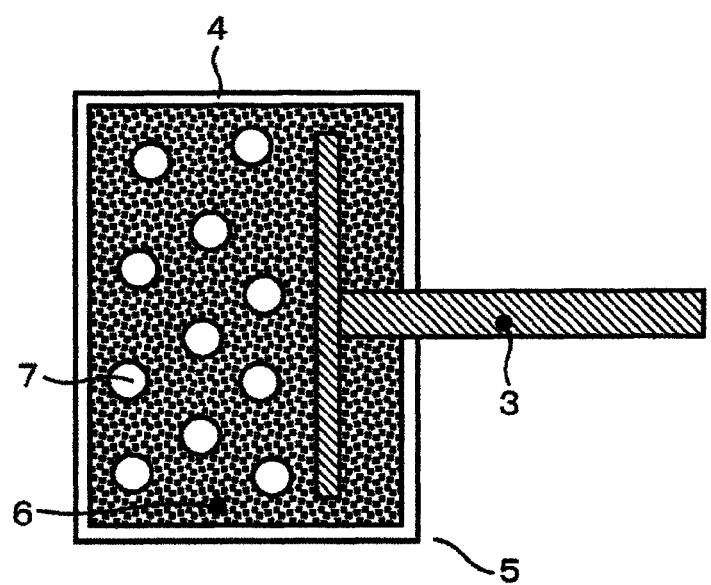
FIG. 2 is a diagram illustrating an example of an electrolytic etching electrode of the present invention for electrolytically etching the surface of nuclear reactor core internals.

Furthermore, another example on an electrolytic etching electrode of the present invention for electrolytically etching the surface of nuclear reactor core internals is illustrated using FIG. 2.

The electrolytic etching electrode (5) of the present invention was developed for the purpose of being easily able to recover, even in case the sponge (6) in an integrated manner with the gelled etching liquid (4) is deviated from the electrode (3) during a use in water. The electrolytic etching electrode (5) of the present invention comprises at least a sponge (6) wherein some of its holes have a communicating structure, an electrode (3), and a gelled etching liquid (4) which is disposed in front of the electrode (3) in an integrated manner with the sponge (6) wherein some of its holes have a communicating structure. For the etching liquid, for example, a 10% aqueous solution of oxalic acid is used, while for the gelling agent, for example, agarose is used.

The integration of the etching liquid and the sponge (2), wherein some of its holes have a communicating structure, is carried out by impregnating (infiltrating) the sponge (6), wherein some of its holes have a communicating structure, with a mixed liquid of an etching liquid and a gelling agent, followed by the gelation of the mixed liquid, wherein the sponge (6) is previously installed in front of the electrode (3).

For the electrode (3), it is desirable to use austenitic stainless steel or platinum.

In addition, a closed cell (independent air bubble) (7) is sprinkled in holes having no communicating structure of the sponge (6), wherein some of holes have a communicating structure, and the specific gravity of the whole sponge in an integrated manner with the gelled etching liquid becomes less than 1 even at a state that a water pressure at an execution position is loaded.

This makes the retrieval of the sponge easy, because when the sponge in an integrated manner with the gelled etching liquid is demounted from the electrode (3), buoyancy acts, so that the sponge comes up to the surface of water.

EXAMPLE 3

Figure 3:
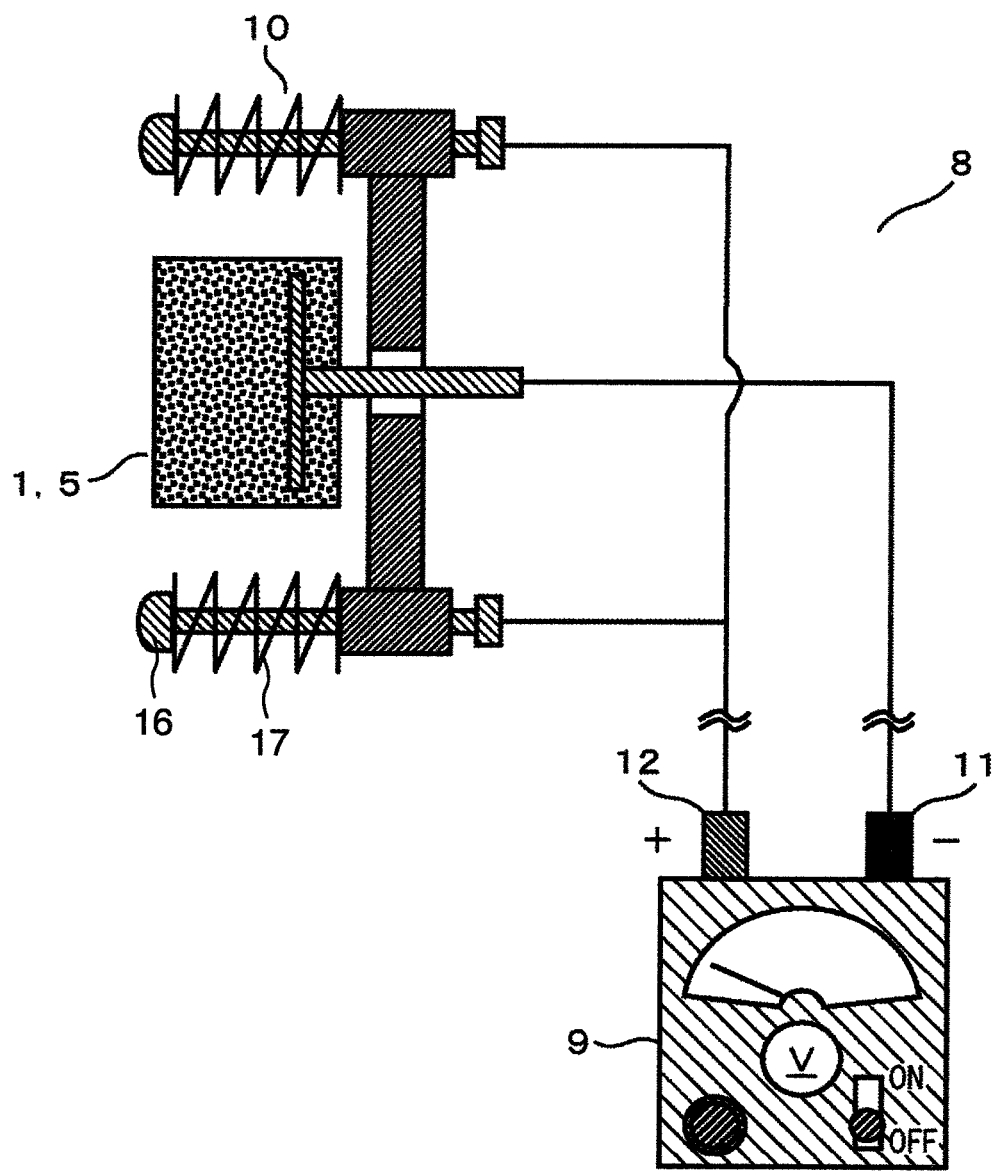
FIG. 3 is a diagram illustrating an example of an apparatus of the present invention for electrolytically etching the surface of nuclear reactor core internals in water.

An apparatus of the present invention for electrolytically etching the surface of nuclear reactor core internals in water is illustrated using FIG. 3.

An electrolytic etching apparatus (8) of the present invention comprises at least electrolytic etching electrodes (1, 5), a direct-current power supply (9), and a means (10) for electrically connecting the anode of the direct-current power supply to the surface of core internals.

The means (10) for electrically connecting the anode of the direct-current power supply to the surface of the core internals can include, for example, a means which can change a position of a metallic and electroconductive contact bar (16) according to an irregularity (concavity and convexity) of the surface of the core internals and which comprises the contact bar (16) and a spring (17) in combination.

The cathode (11) of the direct-current power supply (9) is electrically connected to electrolytic etching electrodes (1, 5), while the anode (12) of the direct-current power supply (9) is electrically connected to the surface of core internals via the means (10) for electrically connecting the anode of the direct-current power supply to the surface of the core internals.

According to this example, an electrolytic etching apparatus having a simple structure can be provided.

EXAMPLE 4

Figure 4:
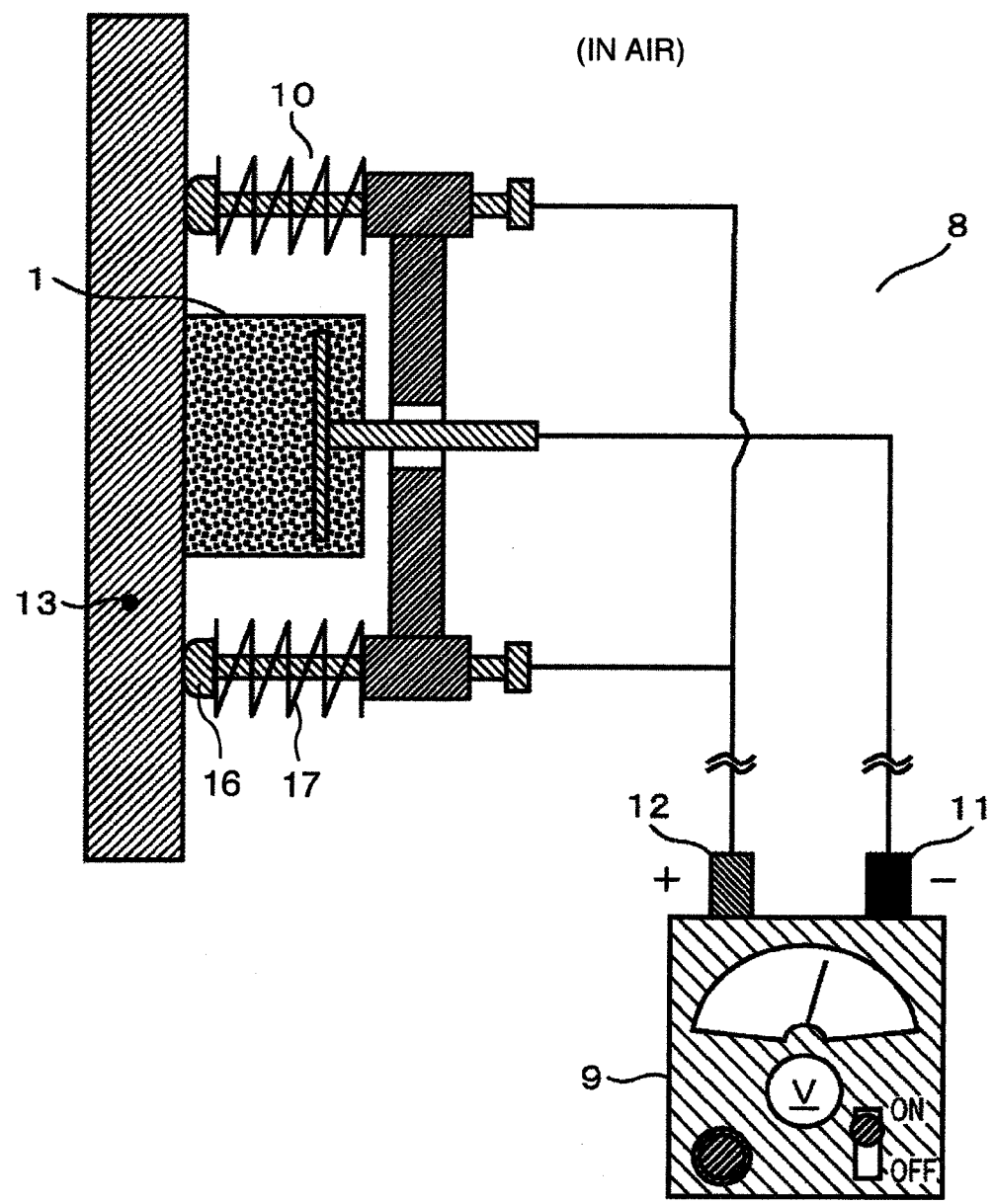
FIG. 4 is a diagram illustrating an example of a method of the present invention of electrolytically etching the surface of nuclear reactor core internals in air.

A method of the present invention for electrolytically etching the surface of nuclear reactor core internals in the air is illustrated using FIG. 4.

An electrolytic etching of the surface (13) of the core internals in air is carried out by using at least an electrolytic etching apparatus (8). The electrolytic etching is carried out by turning on the electric source of a direct-current power supply (9) to apply a prescribed voltage at a state in which an electrolytic etching electrode (1) electrically connected to the cathode (11) of the direct-current power supply (9) is brought into contact with the surface (13) of the core internal structure electrically connected to the anode (12) of the direct-current power supply (9) via a means (10) for electrically connecting the surface of the core internals to the anode of the direct-current power supply.

In addition, the anode (12) of the direct-current power supply (9) and the surface (13) of the core internals are electrically connected to each other via a means (10) for electrically connecting the surface of the core internals to the anode of the direct-current power supply.

By applying the electrolytic etching method of the present invention to an electrolytic etching in a remote position, an electrolytic etching can be carried out by energizing (turning on electricity) the direct-current power supply (9), which is arranged at a position distant from the execution surface such as on the water, at a state in which the electrolytic etching apparatus (8) is pressed to the execution surface.

EXAMPLE 5

Figure 5:
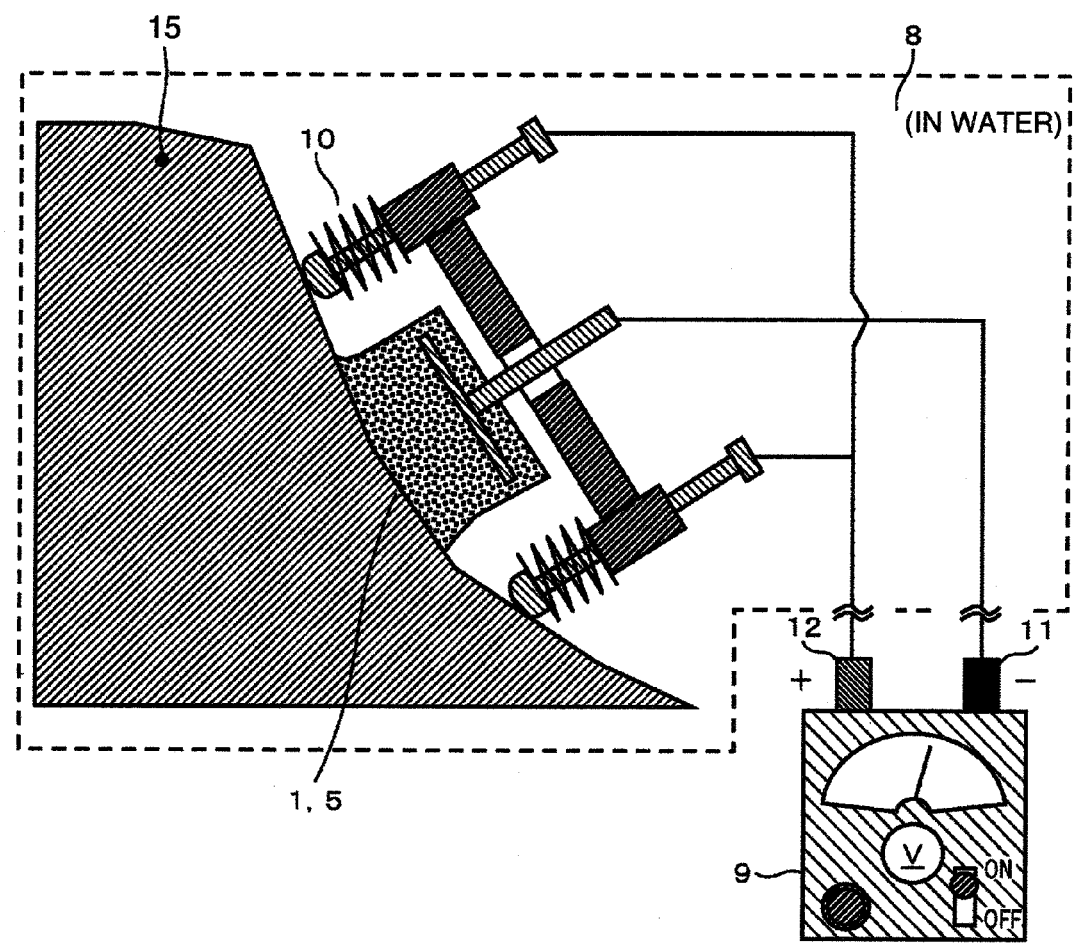
FIG. 5 is a diagram illustrating an example of a method of the present invention of electrolytically etching the surface of nuclear reactor core internals in water.

A method of the present invention of electrolytically etching the surface of nuclear reactor core internals in water is illustrated using FIG. 5.

The electrolytic etching of the surface (15) of the core internals in water is carried out by using at least an electrolytic etching apparatus (8). The electrolytic etching is carried out by turning on the electric source of a direct-current power supply (9) to apply a prescribed voltage at a state in which an electrolytic etching electrodes (1, 5) electrically connected to the cathode (11) of the direct-current power supply (9) is brought into contact with or is approximated to the surface (15) of the core internals electrically connected to the anode (12) of the direct-current power supply (9).

In addition, the anode (12) of the direct-current power supply (9) and the surface (15) of the core internals are electrically connected to each other via a means (10) for electrically connecting the surface of the core internals to the anode of the direct-current power supply.

By applying the electrolytic etching method of the present invention to an electrolytic etching onto the bottom of a nuclear reactor core having a curved surface shape, it does not become necessary to form a watertight space through an execution surface and a container and thus an electrolytic etching can be easily conducted.

EXAMPLE 6

Figure 6:
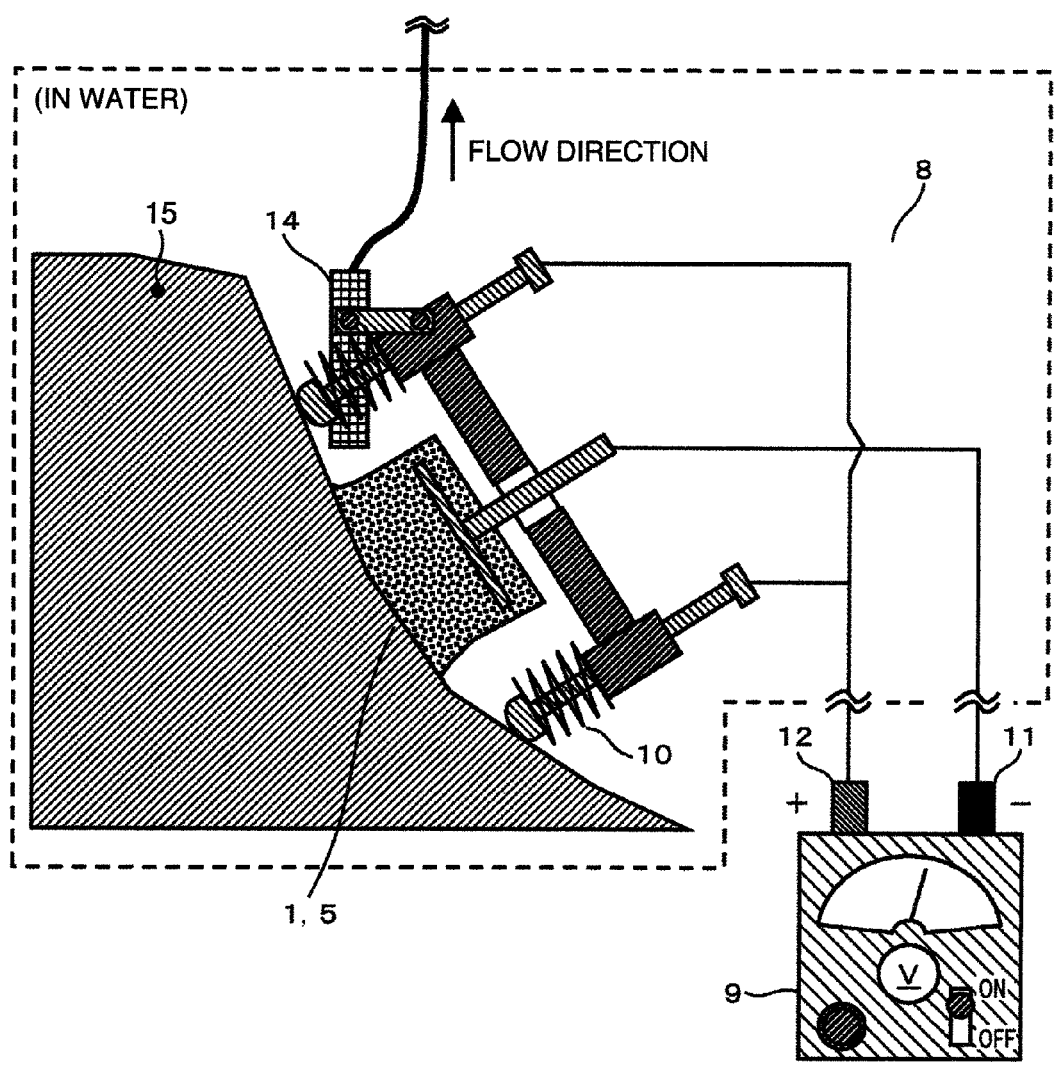
FIG. 6 is a diagram illustrating an example of a method of the present invention of electrolytically etching the surface of nuclear reactor core internals, wherein water, adjacent to an electrolytic etching electrode, is sucked in during turning on electricity.

A method of the present invention of electrolytically etching the surface of nuclear reactor core internals, wherein water, adjacent to an electrolytic etching electrode, is sucked in during turning on electricity, is illustrated using FIG. 6.

When using an electrolytic etching apparatus, the electric source of a direct-current power supply (9) is turned on to apply a prescribed voltage at a state in which electrolytic etching electrodes (1, 5) electrically connected to the cathode (11) of the direct-current power supply (9) is brought into contact with or is approximated to the surface (15) of the core internals electrically connected to the anode (12) of the direct-current power supply (9), the surface (15) of the core internal structure is electrically etched. In this case, a metal ion is eluted, and thus a water absorbing means (14) is used to suck in water wherein a metal ion was eluted, adjacent to the electrolytic etching electrodes, followed by the recovery of the water. The absorption of water by the water absorbing means (14) is carried out, for example, by sucking in water within the nuclear reactor through a pump, wherein a water intake is disposed adjacent to the electrolytic etching electrode.

By applying a method of sucking in water, which is adjacent to an electrolytic etching electrode, during turning on electricity of the present invention to an electrolytic etching in water, a metal ion eluted (dissolved) by the electrolytic etching can be recovered, and an influence on a water environment in an execution region can be decreased.

EXAMPLE 7

Figure 7:
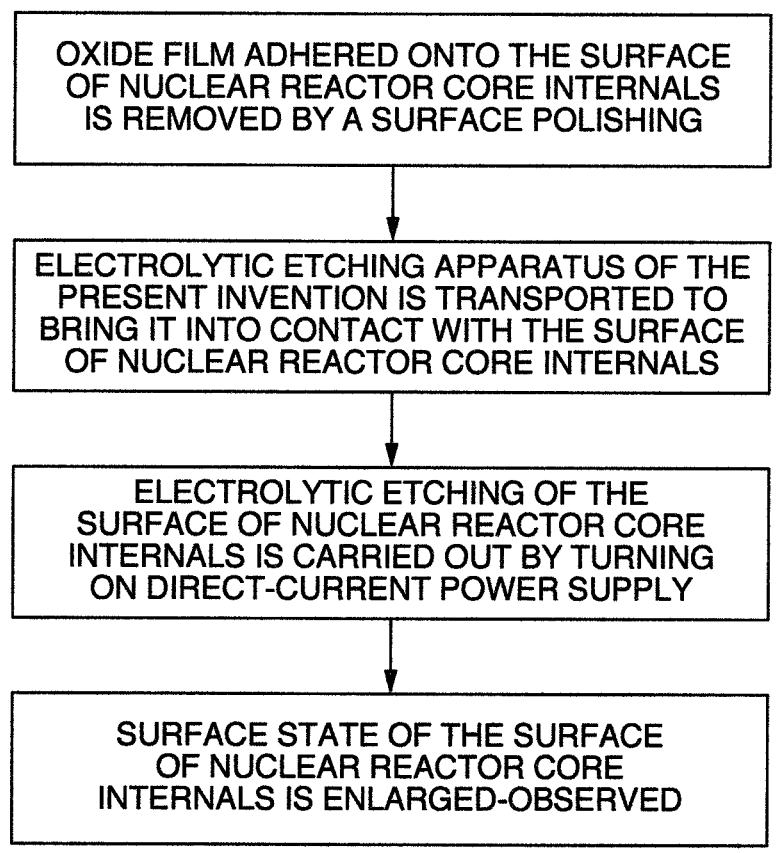
FIG. 7 is a diagram illustrating procedures for carrying out an enlarged observation of the surface of nuclear reactor core internals after electrolytically etching the surface.

A method of observing the surface of nuclear reactor core internals is illustrated using FIG. 7.

First, an oxide film adhered onto the surface of nuclear reactor core internals is removed by a surface polishing. Then, the electrolytic etching apparatus of the present invention is transported to bring it into contact with the surface of nuclear reactor core internals. An electrolytic etching of the surface of nuclear reactor core internals is carried out by energizing (turning on electricity) a direct-current power supply at a state in which the electrolytic etching apparatus of the present invention is contact with the surface of nuclear reactor core internals. Then, an enlarged observation of the surface of nuclear reactor core internals is carried out to observe a surface state after the electrolytic etching. Means for the enlarged observation of the surface of nuclear reactor core internals can include a method of directly enlarged-observing the surface of nuclear reactor core internals by using an underwater enlarged-observing camera and a method of transcribing a surface aspect of the surface of nuclear reactor core internals to a replica once and then enlarged-observing a surface of the replica recovered.

By using the observing method of the surface of nuclear reactor core internals of the present invention, a grain boundary of a metallographic structure can be visually recognized.

It should be further understood by those skilled in the art that although the foregoing description has been made on embodiments of the invention, the invention is not limited thereto and various changes and modifications may be made without departing from the spirit of the invention and the scope of the appended claims.

INDUSTRIAL APPLICABILITY

The present invention can be applied by an underwater remote control for investigating surface conditions. Especially, it is available for the investigation of nuclear reactor core internals in a nuclear power plant. Specifically, after removing an oxide film adhered onto the surface of nuclear reactor core internals by a surface polishing, the electrolytic etching apparatus of the present invention is transported to bring it into contact with the surface of nuclear reactor core internals, and an electrolytic etching is carried out by energizing (turning on electricity) a direct-current power supply. Means for transporting the electrolytic etching apparatus can include, for example, a method of transporting it by attaching the electrolytic etching apparatus of the present invention to a front edge of an operating pole. Furthermore, even when the subject of execution is one having a complicated curved surface shape, such as the bottom of a nuclear reactor (PWR and BWR), it is available for the investigation.

DESCRIPTION OF REFERENCE NUMERALS 1, 5 electrolytic etching electrode of the present invention
2 sponge wherein holes have a communicating structure
3 electrode
4 gelled etching liquid
6 sponge wherein some of holes have a communicating structure
7 closed cell
8 electrolytic etching apparatus of the present invention
9 direct-current power supply
10 means for electrically connecting the surface of core internals and the anode of a direct-current power supply
11 cathode
12 anode
13 surface of core internal
14 water absorbing means
15 surface of core internals
16 contact bar
17 spring

The invention claimed is:

1. An electrolytic etching method for electrolytically etching a surface of nuclear reactor core internals, comprising the step of
turning on electricity at a state in which an electrolytic etching electrode is brought into contact with or approximated to a surface of the core internals electrically connected to an anode of a direct-current power supply,
wherein said electrolytic etching electrode is electrically connected to a cathode of the direct-current power supply and is provided with a sponge with a gelled etching liquid arranged into its holes having a communicating structure.

2. The electrolytic etching method according to claim 1, further including the step of carrying out the electrolytic etching in water, wherein air bubbles are distributed in said sponge of said electrolytic etching electrode.

3. The electrolytic etching method according to claim 2, further including the step of sucking in water adjacent to the electrolytic etching electrode during turning on electricity.

4. The electrolytic etching method according to claim 1, further including the steps of: electrolytically etching the surface of nuclear reactor core internals by turning on a direct-current power supply; and then carrying out an enlarged observation of the surface of nuclear reactor core internals to confirm a surface state.

5. The electrolytic etching method according to claim 4, wherein said enlarged observation of the surface of nuclear reactor core internals is carried out by transcribing a surface aspect of the surface of nuclear reactor core internals to a replica once and then enlarged-observing a surface of the replica recovered.

* * * * *